United States Patent
Tseng (10) Patent No.: US 12,433,874 B2
(45) Date of Patent: Oct. 7, 2025

(54) LIPOSOME COMPRISING RAPAMYCIN OR A DERIVATIVE THEREOF AND USE THEREOF IN THERAPY

(71) Applicant: PRESCIENCE BIOTECHNOLOGY INC., Taipei (TW)

(72) Inventor: Tzu-Ying Tseng, Taipei (TW)

(73) Assignee: PRESCIENCE BIOTECHNOLOGY INC., Taipei (TW)

( * ) Notice: Subject to any disclaimer, the term of this patent is extended or adjusted under 35 U.S.C. 154(b) by 0 days.

(21) Appl. No.: 17/661,153

(22) Filed: Apr. 28, 2022

(65) Prior Publication Data
US 2023/0346754 A1    Nov. 2, 2023

(51) Int. Cl.
| A61K 31/436 | (2006.01) |
| A61K 9/1271 | (2025.01) |
| A61K 47/24 | (2006.01) |
| A61K 47/26 | (2006.01) |
| A61K 47/28 | (2006.01) |
| A61P 35/00 | (2006.01) |

(52) U.S. Cl.
CPC .......... *A61K 31/436* (2013.01); *A61K 9/1271* (2013.01); *A61K 47/24* (2013.01); *A61K 47/26* (2013.01); *A61K 47/28* (2013.01); *A61P 35/00* (2018.01)

(58) Field of Classification Search
CPC .... A61K 31/436; A61K 9/1271; A61K 47/24; A61K 47/26; A61K 47/28; A61P 35/00
See application file for complete search history.

(56) References Cited

U.S. PATENT DOCUMENTS

2006/0165767 A1* 7/2006 Eibl ..................... A61P 35/00
424/450

FOREIGN PATENT DOCUMENTS

| CA | 1291425 | * | 4/1986 |
| CA | 3082831 | * | 5/2019 |
| CN | 108926533 A | | 12/2018 |
| EP | 3346989 B1 | | 12/2020 |
| WO | 2015/068020 | * | 5/2015 |
| WO | 2017/120504 | * | 7/2017 |
| WO | 2020257148 A1 | | 12/2020 |

OTHER PUBLICATIONS

Rouf, M.A., et al Journal of Liposome Research, vol. 19 (4), pp. 322-331, 2009.*
Onyesom, I et al Molecular Pharmaceutics, , 10, pp. 4281-4293, 2013.*
Dhanbarzadeh, S., et al Advanced Pharmaceutical Bulletin, vol. 13 (1), pp. 25-29, 2013.*
Decision of Rejection issued in Taiwan Patent Application No. 111116304 dated Jun. 14, 2023. Machine translation in English included.
Eloy, Josimar O. et al., "Co-loaded paclitaxel/rapamycin liposomes: Development, characterization and in vitro and in vivo evaluation for breast cancer therapy," Colloids Surf B: Biointerfaces, May 2016, 141: 74-82.
Extended European Search Report issued in EP Patent Application No. 22170621.1 on Oct. 24, 2022.
First Office Action issued in Taiwan Patent Application No. 111116304 dated Jan. 5, 2023. English translation of Search Report included.

* cited by examiner

*Primary Examiner* — Walter E Webb
(74) *Attorney, Agent, or Firm* — Prosyla Group PC (57) ABSTRACT

The present disclosure relates to a lipid-based formulation comprising rapamycin and derivatives thereof, and also relates to using the formulation for treatment of diseases or conditions, such as cancers, immuo-related disease, etc.

9 Claims, 7 Drawing Sheets

LIPOSOME COMPRISING RAPAMYCIN OR A DERIVATIVE THEREOF AND USE THEREOF IN THERAPY

FIELD OF THE DISCLOSURE

The present disclosure relates to a lipid-based formulation comprising rapamycin and derivatives thereof and their applications.

BACKGROUND OF THE DISCLOSURE

The mammalian target of rapamycin (mTOR) is a kinase that in humans is encoded by the MTOR gene. The mTOR integrates the input from upstream pathways, and the mTOR pathway is a central regulator of mammalian metabolism and physiology, with important roles in the function of tissues. For example, mTOR signaling may result in diseases related to metabolism, immune function, brain function, aging and even cancers. Regulation, mostly inhibition, of mTOR may improve or treat the diseases and conditions. The first-known inhibitor of mTOR is rapamycin, from which mTOR's name derives:

Rapamycin, M.W.: 914.17 g/mol.

Clinical applications of rapamycin include use as an immunosuppressant, treatment of tuberous sclerosis complex, drug-eluting coronary stent, etc. Rapamycin, as a BCS Class II drug, i.e., having low aqueous solubility (2.6 µg/mL) and high permeability, only exhibits a bioavailability of 14% to 18%, which thus precludes it from clinical development as an anti-cancer agent. The solution to overcome the low solubility of rapamycin is to develop analogs or derivatives thereof, namely "rapalogs." Examples of rapalogs include everolimus, temsirolimus, etc. Though everolimus may exhibit ~20% bioavailability in a tablet form and temsirolimus may exhibit even up to 100% bioavailability via intravenous infusion, the oral rapalog has low bioavailability and the injectable rapalog is highly allergenic due to excipients. Hence, there is still no clinically available rapamycin or rapalogs formulation with high bioavailability, high efficacy and low toxicity.

SUMMARY OF THE DISCLOSURE

The present invention is based in part on the development of a liposome specific to rapamycin or an analog thereof, or a prodrug or salt of rapamycin or its analog, having good stability before or after lyophilization and hydration, superior tumor inhibition ability and reduced toxicity of rapamycin or its analog.

The present disclosure provides a liposome comprising a lipid ingredient encapsulating rapamycin or an analog thereof, or a prodrug or salt of rapamycin or its analog, wherein:

the lipid ingredient is selected from the group consisting of: cholesterol, phosphatidylcholine (PC), L-α-phosphatidylcholine (EggPC), 1,2-Didecanoyl-sn-glycerol-3-phosphocholine (DDPC), 1,2-distearoyl-sn-glycerol-3-phosphorylethanolamine (DSPE), distearoyl phosphatidylcholine (DSPC), dioleoyl phosphatidylethanolamine (DOPE), dipalmitoyl phosphatidylcholine (DPPC), hydrogenated soy phosphatidylcholine (HSPC), 1,2-palmitoyl-phosphatidic acid (DPPA), 1,2-dimyristoyl phosphatidylcholine (DMPC), dioleoyl phosphatidylcholine (DOPC), palmitoyl-myristoyl phosphatidylcholine (PMPC), palmitoyl-oleoyl phosphatidylcholine (POPC), dioleoyl phosphatidylglycerol (DOPG), distearoyl phosphatidyl glycerol (DSPG), dipalmitoyl phosphatidylglycerol (DPPG), dipalmitoyl phosphatidylethanolamine (DPPE), or a PEG and combinations thereof;

the rapamycin analog is able to inhibit the mammalian target of rapamycin (mTOR);

the amount of the lipid ingredient, based on the dry weight of the total amount of liposome, ranges from about 30% (w/w) to 95% (w/w); and the amount of rapamycin or an analog thereof, or a prodrug or salt of rapamycin or its analog, based on the dry weight of the total amount of liposome, ranges from about 5% (w/w) to 30% (w/w).

In one embodiment, the liposome is a poly(ethylene glycol) (PEG)-modified liposome.

In some embodiments, the analog of rapamycin is selected from the group consisting of everolimus, temsirolimus, tacrolimus, prerapamycin, zotarolimus, ridaforolimus, 7-epi-rapamycin, 7-thiomethyl-rapamycin, 7-epi-trimethoxyphenyl-rapamycin, 7-epi-thiomethyl-rapamycin, 7-demethoxy-rapamycin, 32-demethoxy-rapamycin, 2-desmethyl-rapamycin, and 42-O-(2-hydroxy)ethyl rapamycin, rapamycin oximes, rapamycin aminoesters, rapamycin dialdehydes, rapamycin 29-enols, O-alkylated rapamycin derivatives, water-soluble rapamycin esters, alkylated rapamycin derivatives, rapamycin amidino carbamates, biotin esters of rapamycin, carbamates of rapamycin, rapamycin hydroxy esters, rapamycin 42-sulfonates, 42-(N-carboalkoxy) sulfamates, rapamycin oxepane isomers, imidazolidyl rapamycin derivatives, rapamycin alkoxyesters, rapamycin pyrazoles, acyl derivatives of rapamycin, rapamycin amide esters, rapamycin fluorinated esters, rapamycin acetals, oxorapamycins, and rapamycin silyl ethers.

In some embodiments, the amount rapamycin or an analog thereof, or a prodrug or salt of rapamycin or its analog, based on the dry weight of the total amount of liposome, ranges from about 5% (w/w) to 25% (w/w), about 5% (w/w) to 20% (w/w), about 10% (w/w) to 30% (w/w), about 10% (w/w) to 25% (w/w), about 10% (w/w) to 20% (w/w), about 15% (w/w) to 30% (w/w), about 15% (w/w) to 25% (w/w) or about 15% (w/w) to 20% (w/w). In some further embodiments, the amount rapamycin or an analog thereof, or a prodrug or salt of rapamycin or its analog, based on the dry weight of the total amount of liposome, is about 10% (w/w), about 12% (w/w), about 14% (w/w), about 15% (w/w), about 16% (w/w), about 17% (w/w), about 18% (w/w), about 5% (w/w) to 20% (w/w), about 10% (w/w) to 20% (w/w), about 15% (w/w) to 25% (w/w) or about 15% (w/w) to 20% (w/w).

In some embodiments, the lipid ingredient is DOPE, DDPC, cholesterol, DSPE, EggPC, HSPC, DPPC, DMPC, DSPC, PC, a combination of DPPC, DDPC, cholesterol and DSPE (or DSPE-PEG), a combination of DOPE, DDPC, cholesterol and DSPE (or DSPE-PEG), a combination of HSPC and DDPC, a combination of DSPC and DDPC, a combination of DOPE and HSPC or a combination of DOPE and DSPC. In some further embodiments, the lipid ingredient based on the dry weight of the total amount of liposome is about 65% (w/w) to about 95% (w/w) or 70% (w/w) to about 90% (w/w) of DOPE, DDPC, cholesterol, DSPE, EggPC, HSPC, DMPC, DPPC, DSPC, or PC, or a combination of about 15% (w/w) to about 65% (w/w) of DPPC, about 20% (w/w) to about 65% (w/w) of DDPC, about 0% (w/w) to about 30% (w/w) of cholesterol and about 15% (w/w) to about 65% (w/w) of DSPE (or DSPE-PEG), a combination of about 25% (w/w) to about 60% (w/w) of DOPE, about 25% (w/w) to about 70% (w/w) of DDPC, about 0% (w/w) to about 20% (w/w) of cholesterol and about 0% (w/w) to about 25% (w/w) of DSPE (or DSPE-PEG), a combination of about 40% (w/w) to about 55% (w/w) of HSPC and about 30% (w/w) to about 40% (w/w) of DDPC, a combination of about 40% (w/w) to about 55% (w/w) of DSPC and about 30% (w/w) to about 40% (w/w) of DDPC, a combination of about 35% (w/w) to about 45% (w/w) of DOPE and about 35% (w/w) to about 50% (w/w) of HSPC or a combination of about 35% (w/w) to about 45% (w/w) of DOPE and about 35% (w/w) to about 50% (w/w) of DSPC. The amount of rapamycin or an analog thereof, or a prodrug or salt of rapamycin or its analog in the above embodiments is that described herebefore.

In some further embodiments, based on the dry weight of the total amount of liposome, the amounts of the lipid ingredient and rapamycin or an analog thereof, or a prodrug or salt of rapamycin or its analog are those listed below.

TABLE A

Formulation (weight percent; wt % (dry weight))

| Rapamycin | DPPC | DDPC | cholesterol | DSPE-PEG2000 |
|---|---|---|---|---|
| about 10-20% | about 15-65% | about 20-65% | about 0-30% | about 0-25% |
| Rapamycin | DOPE | DDPC | cholesterol | DSPE-PEG2000 |
| about 5-20% | about 25-60% | about 25-70% | about 0-20% | about 0-25% |
| Rapamycin about 16% | EggPC about 84% | | | |
| Rapamycin about 16% | HSPC about 84% | | | |
| Rapamycin about 16% | DSPC about 84% | | | |
| Rapamycin about 17% | DOPE about 83% | | | |
| Rapamycin about 17% | DPPC about 83% | | | |
| Rapamycin about 15-25% | DDPC about 70-90% | | | |
| Rapamycin about 15-20% | DPPC about 80-90% | | | |
| Rapamycin about 18% | HSPC about 47% | DDPC about 34% | | |
| Rapamycin about 18% | DSPC about 48% | DDPC about 34% | | |
| Rapamycin about 17% | DOPE about 41% | HSPC about 43% | | |
| Rapamycin about 17% | DOPE about 40% | DSPC about 43% | | |

In one embodiment, the average particle size of the liposome ranges from about 100 nm to about 500 nm. In some embodiments, the average particle size of the liposome can be about 100 nm, 110 nm, 120 nm, 130 nm, 140 nm, 150 nm, 160 nm, 170 nm, 180 nm, 190 nm, 200 nm, 210 nm, 220 nm, 230 nm, 240 nm, 250 nm, 260 nm, 270 nm, 280 nm, 290 nm, 300 nm, 310 nm, 320 nm, 330 nm, 340 nm, 350 nm, 360 nm, 370 nm, 380 nm, 390 nm, 400 nm, 410 nm, 420 nm, 430 nm, 440 nm, 450 nm, 460 nm, 470 nm, 480 nm, 490 nm, 500 nm, or in a range consisting of any two values noted above, e.g., from 100 nm to 500 nm, from 150 nm to 450 nm, from 100 nm to 250, from 180 nm to 220 nm, etc.

The present disclosure also provides a liposome formulation comprising a liposome of the present disclosure and a cryoprotectant.

In one embodiment, the cryoprotectant is a disaccharide. In some embodiments, the cryoprotectant is sucrose or trehalose. In one embodiments, the cryoprotectant based on the dry weight of the total amount of liposome is about 80% (w/w), about 84% (w/w), about 87% (w/w), about 90% (w/w), about 94% (w/w), about 95% (w/w), about 97% (w/w) or in a range consisting of any two values noted above, e.g., from about 80% to about 97%, from about 84% to about 98%, etc.

The present disclosure also provides a method for treating cancer, diabetes, obesity, neurological disease and genetic disorder and/or preventing an organ transplant rejection, in a subject, comprising administrating a therapeutically effective amount of a liposome of the present disclosure to the subject.

DETAILED DESCRIPTION OF THE DISCLOSURE

Unless defined otherwise, all the technical and scientific terms used herein have the same meaning as is commonly understood by one of ordinary skill in the art. All patents, applications, published applications and other publications are incorporated by reference in their entirety. In the event that there is a plurality of definitions of a term, those in this section prevail unless stated otherwise.

As used herein, the term "rapalog" refers to derivatives of rapamycin with inhibition activity on mTOR.

As used herein, the term "liposome" refers to a microscopic closed vesicle having an internal phase enclosed by lipid bilayer. A liposome can be a small single-membrane liposome such as a small unilamellar vesicle (SUV), large single-membrane liposome such as a large unilamellar vesicle (LUV), a still larger single-membrane liposome such as a giant unilamellar vesicle (GUV), a multilayer liposome having multiple concentric membranes such as a multilamellar vesicle (MLV), or a liposome having multiple membranes that are irregular and not concentric such as a multivesicular vesicle (MVV). According to the disclosure, a liposome is a generic term encompassing a variety of single- and multi-lamellar lipid vehicles formed by the generation of enclosed lipid bilayers or aggregates. Liposomes may be characterized as having vesicular structures with a bilayer membrane, generally comprising a phospholipid, and an inner medium. Liposomes can range in size from several nanometers to several micrometers in diameter. A liposome used according to the disclosure can be made with different methods, as would be known to one of ordinary skill in the art. Further details with respect to the preparation of liposomes are set forth in U.S. Pat. No. 4,342,826 and PCT International Publication No. WO 80/01515, both of which are incorporated by reference.

As used herein, "tumor" denotes a neoplasm, and includes both benign and malignant tumors. This term particularly includes malignant tumors, which can be either solid or non-solid. Tumors can also be further divided into subtypes, such as adenocarcinomas.

As used herein, a "(therapeutically) effective dose/amount" is a dose/amount sufficient to prevent advancement or cause regression of a disease or which is capable of relieving symptoms caused by the disease.

As used herein, "mammal" or "mammalian subject" includes farm animals, such as cows, hogs and sheep, as well as pets or animals used in sports such as horses, dogs, and cats.

Rapamycin ($C_{51}H_{79}NO_{13}$) is a macrolide compound that was isolated in 1975 from *Streptomyces hygroscopicus*. Rapamycin (otherwise known as sirolimus) is an inhibitor of mTOR that prevents activation of T cells and B cells by inhibiting their response to interleukin-2 (IL-2). It is an FDA-approved drug for immunosuppression, possessing both antifungal and antineoplastic properties.

However, rapamycin has poor solubility and pharmacokinetics and thus its therapeutic effect is limited. For BCS Class II or IV drugs (i.e., having low solubility), nanocarriers or conjugates may be a promising way to enhance their bioavailability. Examples include lipid-based nanocarriers, such as liposomes; polymer-based nanocarriers, such as polymeric micelles; inorganic nanoparticles, such as silica nanoparticles; viral nanoparticles; drug conjugates, such as antibody-drug conjugates, etc. Compared with traditional solubilizer or polymer formulations, lipids as vehicles are highly biocompatible and biodegradable. In particular, liposomes can be made of amphiphilic phospholipids, and amphiphilic phospholipids can form a barrier to protect the hydrophobic drug from exposure to aqueous or biological environments. They also can affect pharmacokinetics and distribution. However, the bioavailability of liposome-based oral rapalog is not significantly improved.

Accordingly, the present disclosure provides a liposome specifically for encapsulating rapamycin or an analog thereof, or a prodrug or salt of rapamycin or its analog for cancer therapy in order to improve the low bioavailability and allergic problem of solubilizer. The liposome of the present disclosure provides high bioavailability, high efficacy, and low toxicity.

Liposomes are artificial vesicles composed of concentric lipid bilayers separated by water-compartments and have been extensively investigated as drug delivery vehicles. Due to their structure, chemical composition and colloidal size, all of which can be well controlled by preparation methods, liposomes exhibit several properties which may be useful in various applications. Liposomes are used as carriers for drugs and antigens because they can serve several different purposes. Liposome encapsulated drugs are inaccessible to metabolizing enzymes. Conversely, body components (such as erythrocytes or tissues at the injection site) are not directly exposed to the full dose of the drug. The duration of drug action can be prolonged by liposomes because of a slower release of the drug in the body. Liposomes have a direct potential, which means that targeting options change the distribution of the drug in the body. Cells use endocytosis or phagocytosis mechanism to take up liposomes into the cytosol. Furthermore, liposomes can protect a drug against degradation (e.g. metabolic degradation). However, liposomes have a potential disadvantage in their relatively limited ability to adequately release certain encapsulated drugs (such as anti-cancer drugs).

To improve the quality of the liposome particles, several means can be adopted, such as submicron filtration, lyophilization, etc. In one embodiment, the liposome particles encapsulating rapamycin or an analog thereof, or a prodrug or salt of rapamycin or its analog are processed by submicro filtration to remove precipitated drug or particles of a larger size.

In another embodiment, the liposomes encapsulating rapamycin or an analog thereof, or a prodrug or salt of rapamycin or its analog are processed by lyophilization. The liposomal lyophilization may include the following steps: (1) freezing a liquid containing the liposome particles by decreasing temperature to form a solid/ice form, (2) freeze concentrating the solid/ice form by decreasing pressure, (3) sublimating the solid/ice form by elevating the temperature to obtain a crude product, and (4) conducting final drying to obtain a final liposomal freeze-dried stable product (e.g., lyo-cake). Prior to the lyophilization process, a cryoprotectant can be introduced into the liquid containing the liposome particles to protect the active ingredient (i.e., rapamycin, rapalogs). The lyophilized liposome of the present disclosure is stable for a long time (at least 20 weeks) and is suitable for clinical applications. After hydration of the lyophilized liposome, the liposome can maintain the particle size and stability before lyophilization.

The liposome of the present disclosure demonstrates good stability before or after lyophilization and hydration, superior tumor inhibition ability, and reduced toxicity of rapamycin or its analog.

The liposomes of the present disclosure may be administered by any route that effectively transports the liposomes to the appropriate or desirable site of action. Preferred modes of administration include intravenous (IV) and intra-arterial (IA). Other suitable modes of administration include intramuscular (IM), subcutaneous (SC), and intraperitoneal (IP). Such administration may be bolus injections or infusions. Another mode of administration may be perivascular delivery. The formulation may be administered directly or after dilution. Pharmaceutical compositions comprising the liposomes of the present disclosure may be formulated using one or more physiologically acceptable carriers comprising excipients and auxiliaries known in the art, which facilitate the processing of the active ingredients into preparations that can be used pharmaceutically.

Examples are provided below to more clearly illustrate the concept of the present disclosure.

EXAMPLE

Example 1 Preparation of Liposome of the Disclosure

Preparation of Liposome Containing Rapamycin

Figure 1A:
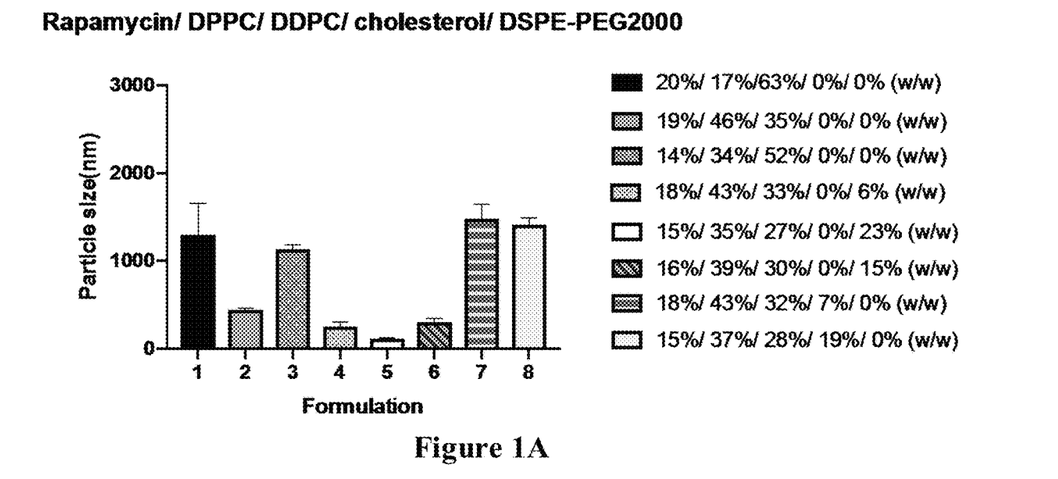
FIGS. 1A and 1B show particle size of different ratio of liposomal rapamycin formulation.
Figure 1B:
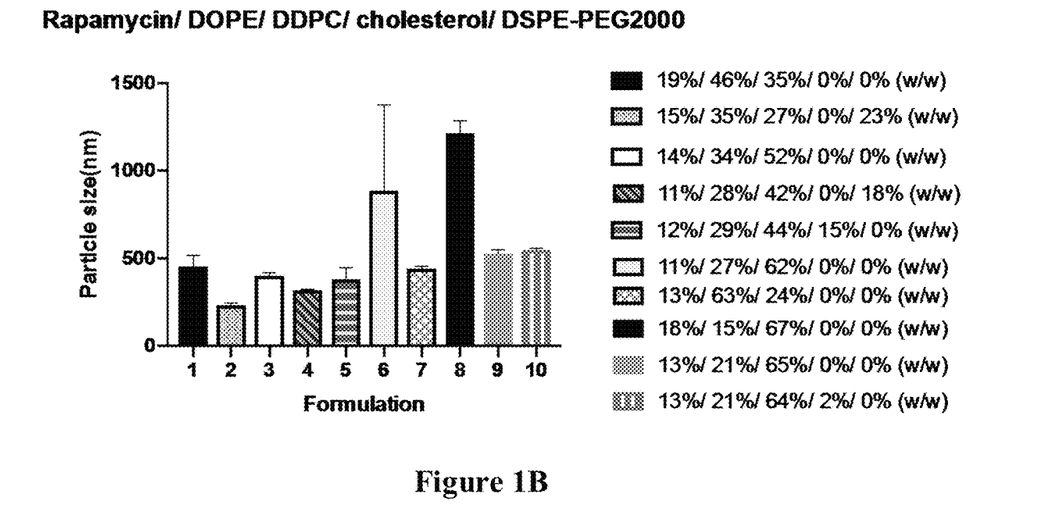

Rapamycin, 1,2-Dioleoyl-sn-glycerol-3-phosphoethanolamine (DOPE), 1,2-Dipalmitoyl-sn-glycero-3-phosphocholine (DPPC), 1,2-Didecanoyl-sn-glycero-3-phosphocholine (DDPC), cholesterol and N-(Methylpolyoxyethylene oxycarbonyl)-1,2-distearoyl-sn-glycero-3-phosphoethanolamine (DSPE-PEG2000) were provided in different dry weight ratios as shown in Table A for the preparation of liposome encapsulating rapamycin. The raw materials are dissolved in the mixture of chloroform and methanol. Heating the solution to 40° C. and reduced the pressure to remove organic solvent and form a thin-film. After the organic solvent is completely removed, adding the solution that containing cryoprotectants to hydrate the thin-film for 1 hour. The particle size of liposomal formulation is shown in FIGS. 1A and 1B. These results revealed that liposomes encapsulating rapamycin with the appropriate amount of DSPE-PEG2000 perform a smaller particle size.

Preparation of Liposome Containing Rapamycin (RAP-P)

Rapamycin, 1,2-Dipalmitoyl-sn-glycero-3-phosphocholine (DPPC), 1,2-Didecanoyl-sn-glycero-3-phosphocholine (DDPC) and N-(Methylpolyoxyethylene oxycarbonyl)-1,2-distearoyl-sn-glycero-3-phosphoethanolamine (DSPE-PEG2000) were provided in a dry weight ratio of 1:2.4:1.9:1.6 for the preparation of liposome encapsulating rapamycin. The raw materials are dissolved in the mixture of chloroform and methanol. Heating the solution to 40° C. and reduced the pressure to remove organic solvent and form a thin-film. After the organic solvent is completely removed, adding the solution that containing cryoprotectants to hydrate the thin-film for 1 hour. The resulting product was lyophilized and the amounts of rapamycin, DPPC, DDPC, DSPE-PEG2000 based on the dry weight of the total amount of liposome are 15%, 35%, 27%, 23%, respectively. The final product is named after the RAP-P formulation.

Preparation of Liposome Containing Rapamycin (RAP-E)

Rapamycin, 1,2-Dioleoyl-sn-glycerol-3-phosphoethanolamine (DOPE), 1,2-Didecanoyl-sn-glycero-3-phosphocholine (DDPC) and N-(Methylpolyoxyethylene oxycarbonyl)-1,2-distearoyl-sn-glycero-3-phosphoethanolamine were provided in a dry weight ratio of 1:2.4: 1.8:1.6 for the preparation of liposome encapsulating rapamycin. The raw materials are dissolved in the mixture of chloroform and methanol. Heating the solution to 40° C. and reduced the pressure to remove organic solvent and form a thin-film. After the organic solvent is completely removed, adding the solution that containing cryoprotectants to hydrate the thin-film for 1-2 hours. The resulting product was lyophilized and the amounts of rapamycin, DOPE, DDPC and DSPE-PEG2000 based on the dry weight of the total amount of liposome are 15%, 35%, 27%, 23%, respectively. The final product is named after the RAP-E formulation.

Characterization

The average particle size and polydispersity index (PI) of the particle size of the RAP-P formulation were 127.4+/−10.8 nm and 1.29+/−0.41, respectively. The average particle size and PI of the particle size of the RAP-E formulation were 348.6+/−30.9 nm and 0.47+/−0.13, respectively. The results show that both RAP-P and RAP-E can be used as proper formulations for use in administering rapamycin.

Example 2 Different Forms of Liposome Formulation

To investigate the applications of the liposome formulation, RAP-P and RAP-E formulations noted in Example 1 were further processed.

Submicron Filtration

The RAP-P and RAP-E formulations were filtered via a 0.45 μm membrane to remove free or precipitated drugs, particles and impurities of a larger size to increase the stability and safety of the product. To verify the validity of the data, samples with rapamycin standard of different concentrations (from 0.05 to 5 g/mL) were used in UPLC-MS/MS tests to establish a calibration curve of signal (area) to rapamycin concentration. Results showed that the coefficient of determination ($r^2$) of the said linear calibration curve was 0.9999.

The average particle size and PI of the particle size of the RAP-P formulation after filtration were 182.4+/−4.3 nm and 1.10+/−0.07, respectively. The average particle size and PI of the particle size of the RAP-E formulation after filtration were 219.0+/−5.1 nm and 0.58+/−0.09, respectively. The results showed that, after filtration, both RAP-P and RAP-E formulations exhibit narrower particle size distribution, and the average particle size of RAP-E formulation is reduced by about 37% reduction.

Lyophilization

Figure 2A:
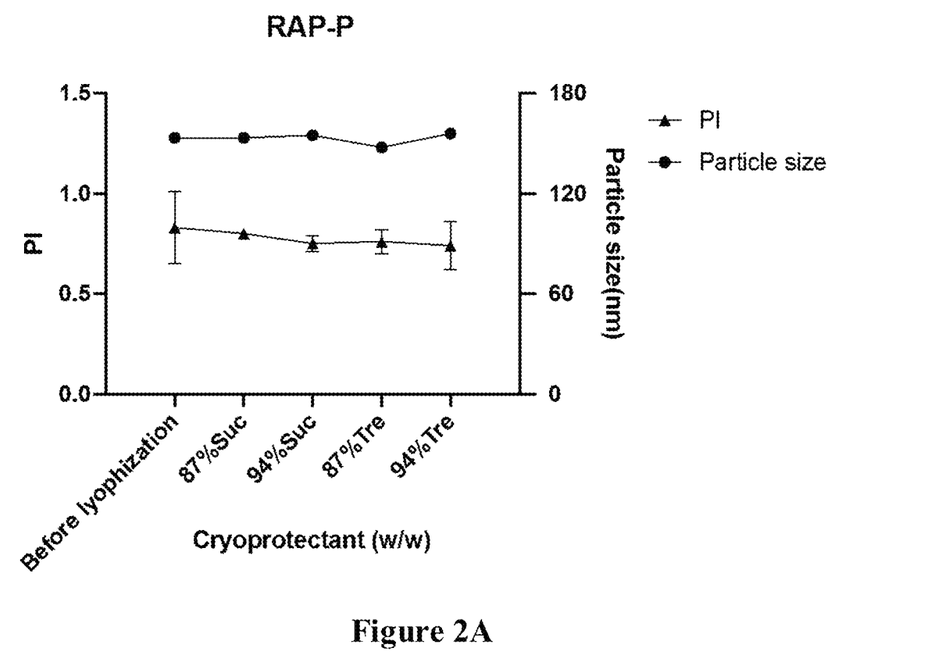
FIGS. 2A, 2B, 3A and 3B show characteristics of lyophilized products and re-hydrated lyophilized products.
Figure 2B:
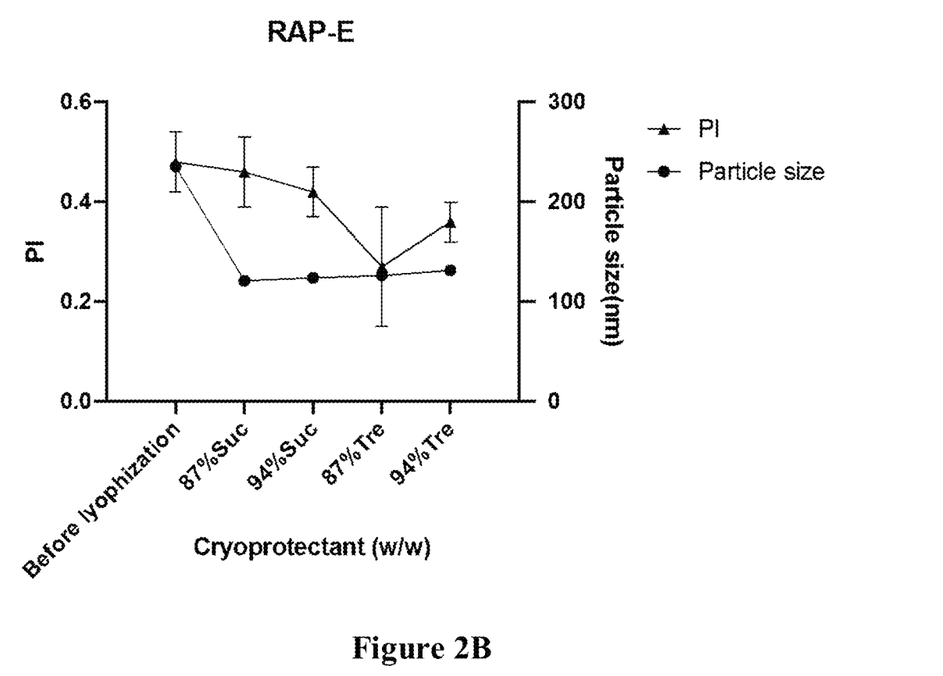

The RAP-P and RAP-E formulations were lyophilized to obtain lyophilized products. At first, freezing the sample at minus 45° C. Then vacuum the pressure to 200 mTorr to remove most of the aqueous through primary drying. At last, increasing the temperature to minus 20° C. for secondary drying in order to remove the residual aqueous. To evaluate the effect of cryoprotectants, sucrose and trehalose, at a final concentration (w/w) of 87% or 94%, were introduced into the formulation before lyophilization. The average particle size is shown in FIGS. 2A and 2B, and the results show that both sucrose and trehalose, at a final concentration (w/w) of 87% or 94%, do not alter or impact the characterization of liposome particles after lyophilization.

Figure 3A:
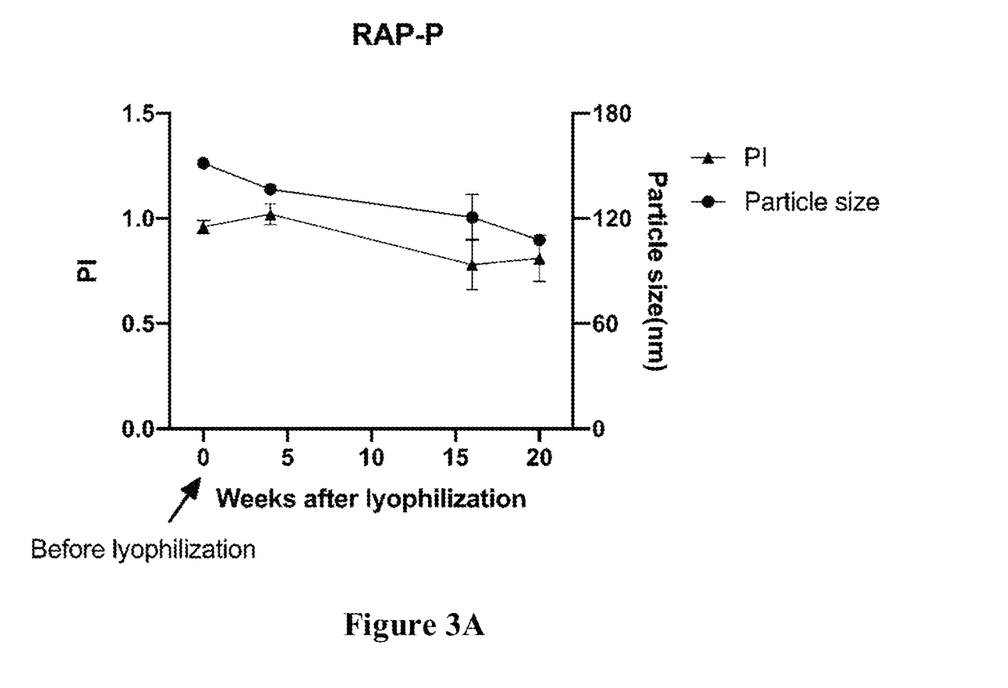
Figure 3B:
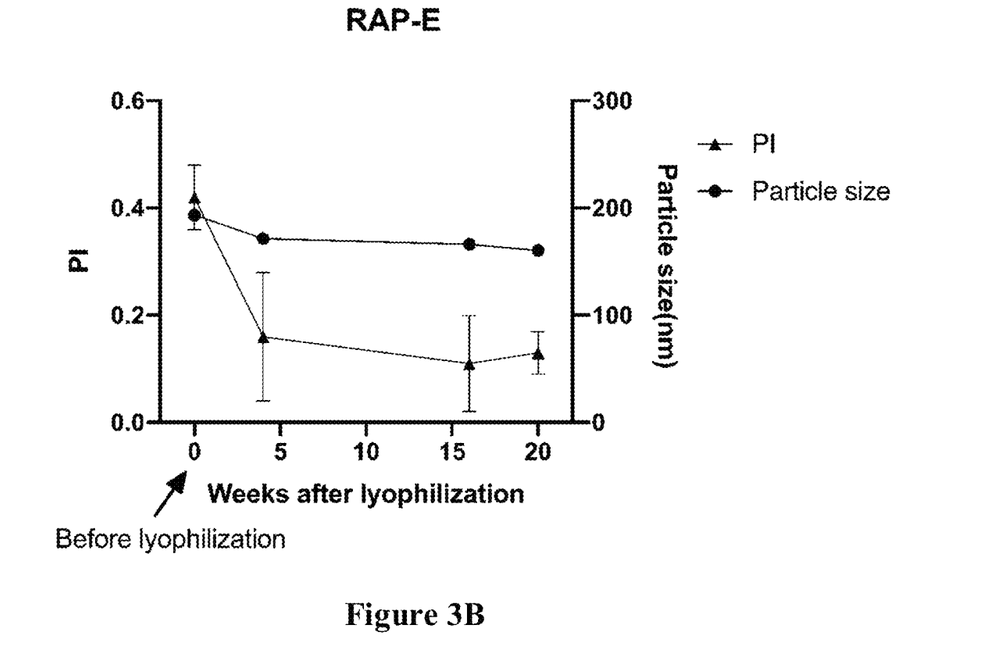

Long-term storage stability of lyophilized products was also verified. The lyophilized products of RAP-P and RAP-E formulation, with 87% (w/w) of trehalose as the cryoprotectant, were stored at −20° C. (minus 20° C.) for 20 weeks, and parts of the products were retrieved after being stored for 4, 16 and 20 weeks and re-hydrated to 2 mg/mL for characterization. The average particle size and PI of particle size of the re-hydrated products are shown in FIGS. 3A and 3B. The results revealed that the lyophilized products can be stable for at least 20 weeks when stored at −20° C. (minus 20° C.).

Example 3 In Vivo Studies

To study the applicability of the claimed formulation, toxicity study, pharmacokinetic and efficacy thereof were researched in vivo with mice.

Figure 4A:
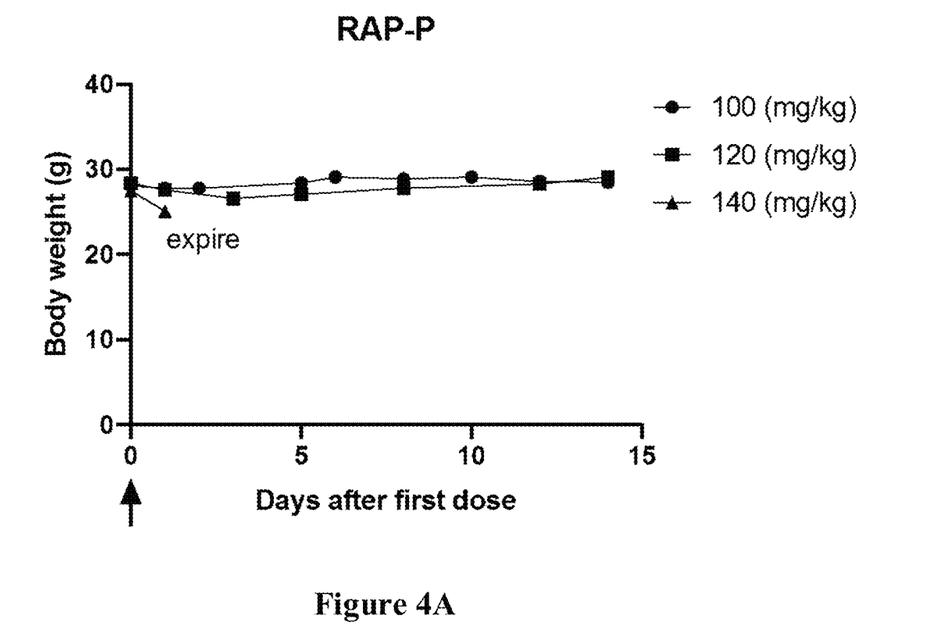
FIGS. 4A and 4B show in vivo toxicity results on Balb/c mice.
Figure 4B:
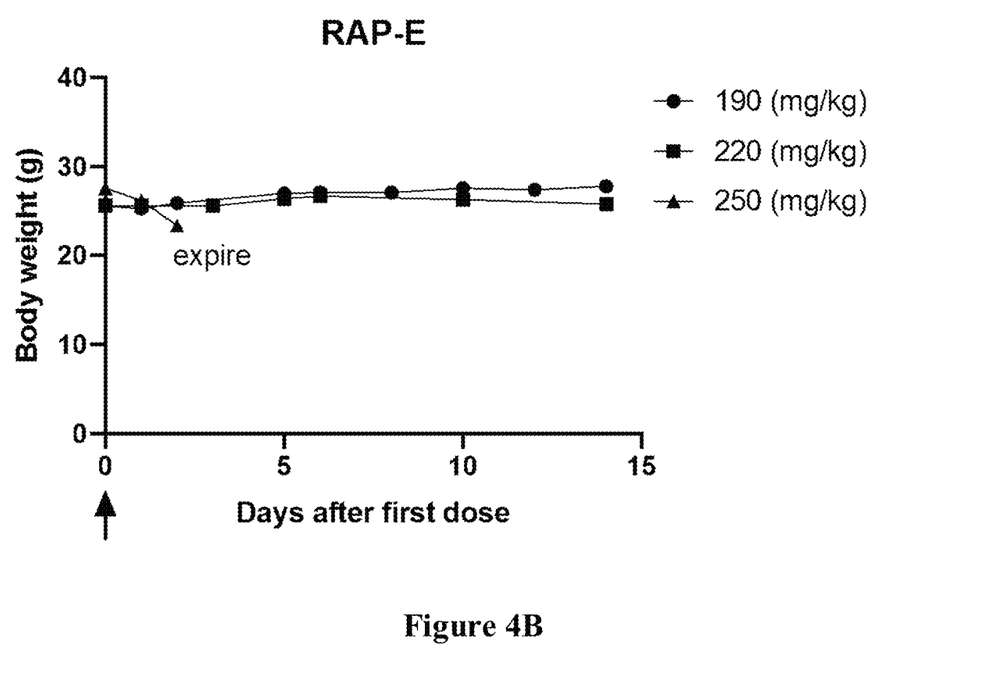

Toxicity Study 6-8 week old male BALB/c mice were obtained from BioLasco (Ilan, Taiwan). A preliminary toxicity study was conducted with mice administered a single dose of RAP-P and RAP-E formulations, and the body weight change was chosen as the indication. FIGS. 4A and 4B show the results of the study which reveal that the maximum tolerated dose (MTD) of RAP-P formulation is 120 mg/kg in mice, and MTD of RAP-E is 220 mg/kg in mice. For comparison, the lethal dosage 50% (LD50) of rapamycin in previous intravenous injection formulation was 40 mg/kg in rats, equivalent to 80 mg/kg in mice (Baker, H.; Sidorowicz, A.; Sehgal, S. N.; Vézina, C. Rapamycin (ay-22,989), a new antifungal antibiotic. Iii. In vitro and in vivo evaluation. The Journal of antibiotics 1978, 31, 539-545). The inventive liposome formulation of rapamycin provides an MTD dose significantly higher than LD50 of the previous intravenous injection formulation, which would make it benefit in clinical applications.

Pharmacokinetic Study 6-8 week old male BALB/c mice were obtained from BioLasco (Ilan, Taiwan). Animals were randomly divided into 2 groups (n=6). Blood was collected from the cheek before injection. After administration the drug through the tail vein, and blood was collected at 0.083, 0.5, 1, 2, 4, 8, 10, and 24 hours. The blood was extracted with methanol and 0.1M zinc sulfate. The drug concentration in blood was analyzed by UPLC-MS/MS. The details of the pharmacokinetic data of RAP-P and RAP-E formulations are listed in Table 1 below:

TABLE 1

| n = 6 | unit | RAP-P | RAP-E |
|---|---|---|---|
| Administration route | | IV | IV |
| dose | mg/kg | 50 | 50 |
| $C_{max}$ | ng/ml | 18,190 | 24,569 |
| $AUC_{0-24}$ | hr*ng/ml | 71,147 | 63,193 |
| $t_{1/2}$ | hr | 5.47 | 5.84 |
| CL (clearance) | mL/hr/kg | 685 | 755 |

Effect on Treating Xenograft Ovarian Tumor in Mice

Figure 5A:
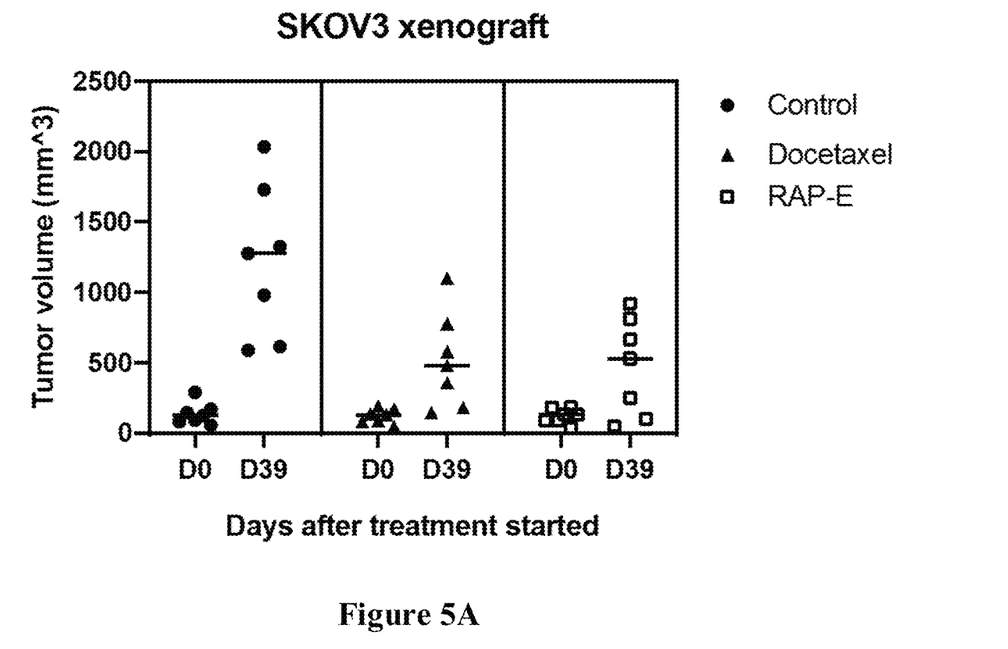
FIGS. 5A and 5B show in vivo experimental results on SKOV3 xenograft NOD/SCID mice.
Figure 5B:
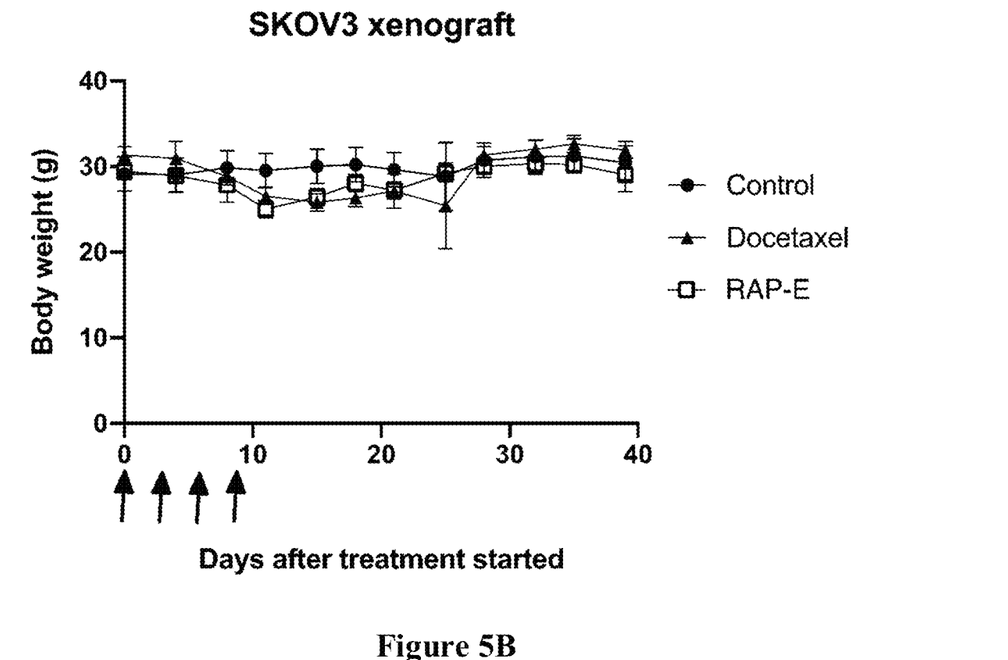

Akt and mTOR phosphorylation are frequently detected in ovarian cancer, and SKOV3, an ovarian cancer cell line, is resistant to cis-platinum and doxorubicin. Hence, SKOV3 was selected as a model tumor for evaluating the treatment efficacy of the inventive liposome containing rapamycin. SKOV3 xenograft on NOD/SCID mice was used as an animal model, classified as three groups: a control group (no drug), a comparative group (administration of docetaxel, dose: 4 mg/kg, Q3d*4) and the inventive group (administration of RAP-E formulation, dose: 50 mg/kg, Q3d*4). 6 week old NOD SCID immunodeficient mice (BioLasco, Ilan, Taiwan) were inoculated subcutaneously with $8*10^5$ SKOV3 cells (human ovarian cancer cell). Following tumor inoculation, measuring the tumor size twice a week, and starting treatment when the tumor grows to 80-100 mm³. FIG. 5A shows the tumor volume on day0 and day39 for each group. Mean inhibition rate of docetaxel and RAP-E formulation were 53% and 62%, respectively; Day 39 tumor inhibition rate of docetaxel and RAP-E formulation were 57% and 61%; and both groups exhibited significant inhibition of tumor volume over the control group. FIG. 5B shows the body weight change of mice in each group. The results reveal that the inventive formulation (RAP-E) can achieve comparable efficacy (inhibition of tumor size) to docetaxel but has lower toxicity.

Effect on Treating Xenograft Breast Tumor in Mice

Figure 6A:
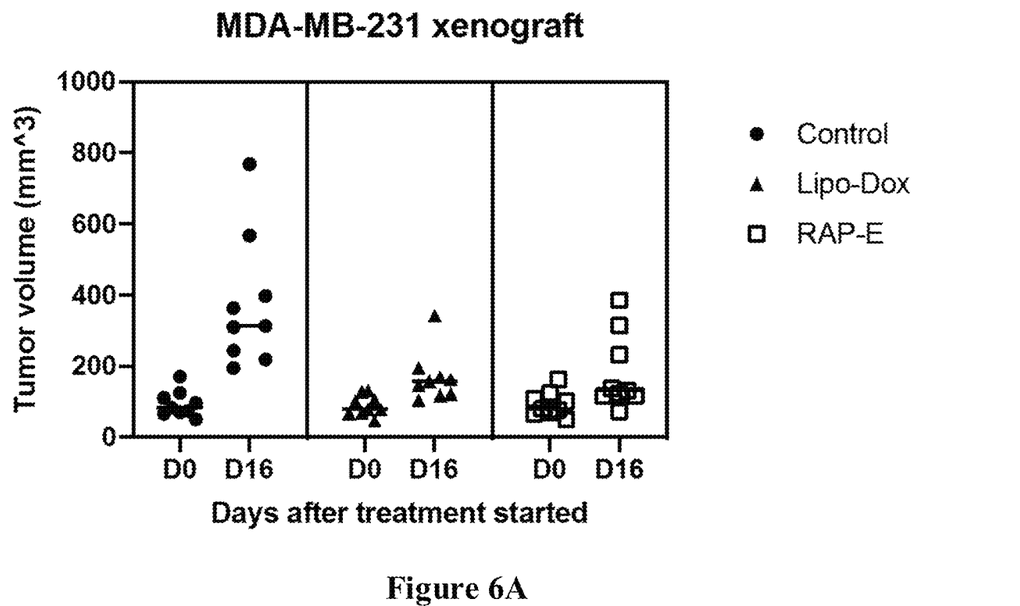
FIGS. 6A and 6B show in vivo experimental results on MDA-MB-231 xenograft NOD/SCID mice.
Figure 6B:
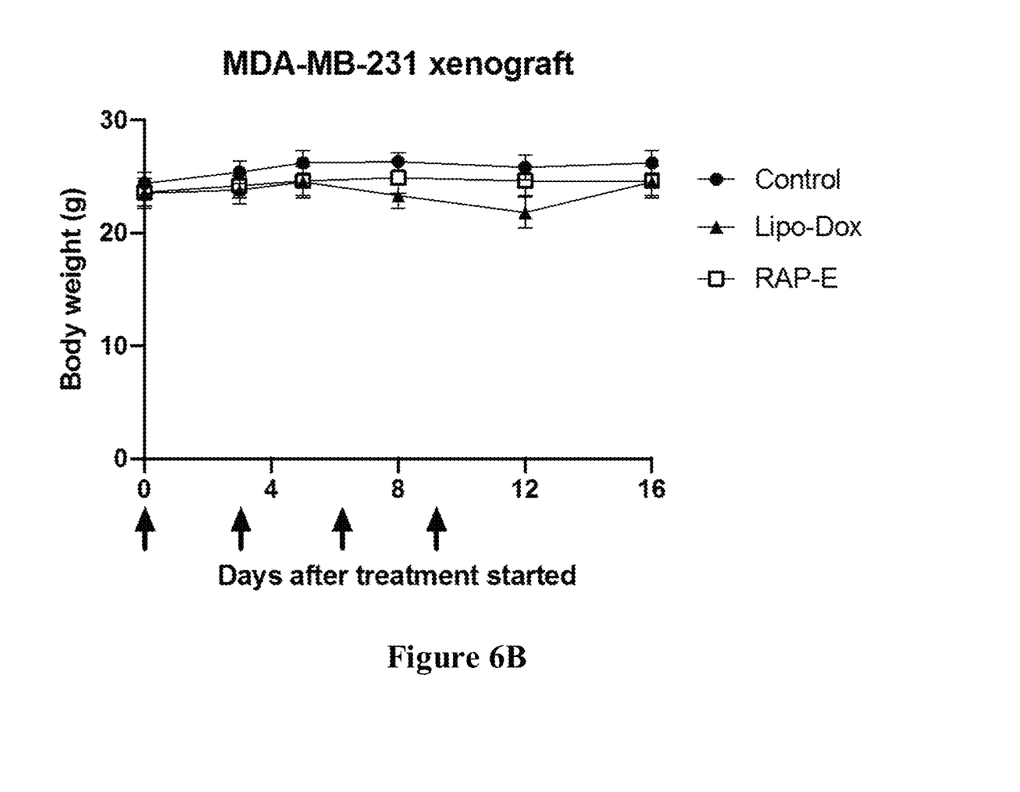

In addition to ovarian cancer, research has shown PI3K/AKT/mTOR and pathways are frequently dysregulated in breast cancer. Upregulated mTORC1 contributes to cell growth, proliferation and promotes tumorigenesis. Rapamycin, an inhibitor of mTOR, also might be promising in the treatment of breast cancer. MDA-MB-231 cells, the triple-negative breast cancer cell line, which targeted therapy is not available can only choose chemotherapy. However, serious side effects may occur. Hence, MDA-MB-231 was selected as a model for evaluating the treatment efficacy of the inventive liposome containing rapamycin. MDA-MB-231 xenograft on NOD/SCID mice was used as an animal model, classified as three groups: a control group (no drug), a comparative group (administration of Lipo-Dox, dose: 2 mg/kg, Q3d*4) and the inventive group (administration of RAP-E formulation, dose: 25 mg/kg, Q3d*4). 6 week old NOD SCID immunodeficient mice (BioLasco, Ilan, Taiwan) were inoculated subcutaneously with $1*10^6$ MDA-MB-231 cells (human breast cancer cell). Following tumor inoculation, measuring the tumor size twice a week, and starting treatment when the tumor grows to 80-100 mm³. FIG. 6A shows the tumor volume on day 0 and day 16 for each group. Mean inhibition rate of Lipo-Dox and RAP-E formulation were 27% and 34%, respectively; Day 16 tumor inhibition rate of Lipo-Dox and RAP-E formulation were 55% and 52%; and both groups exhibited significant inhibition of tumor volume over the control group. FIG. 6B shows the body weight change of mice in each group, especially significant weight loss in the group of administration of Lipo-Dox. The results reveal that the inventive formulation (RAP-E) can achieve comparable efficacy (inhibition of tumor size) to Lipo-Dox but has lower toxicity.

Figure 7A:
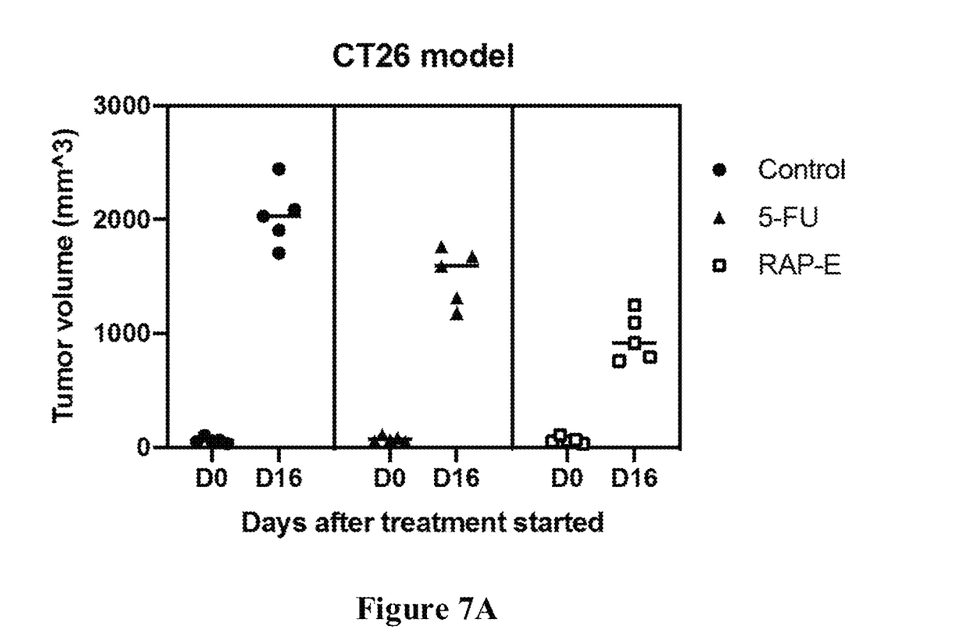
FIGS. 7A and 7B show in vivo experimental results on CT26 Balb/c mice.
Figure 7B:
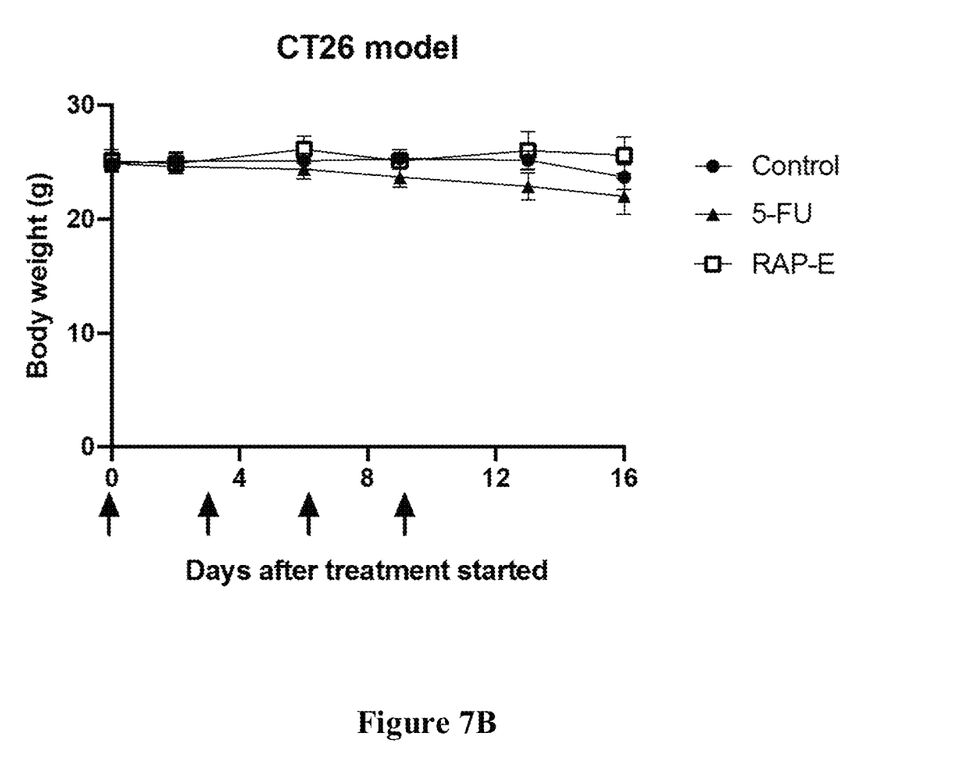

Comparison of Efficacy Between 5-FU and the Inventive Formulation on Mouse Colon Cancer CT26 model on Balb/c mice was used as another animal model, classified as three groups: a control group (no drug), a comparative group (administration of 5-FU, dose: 25 mg/kg, Q3d*4) and the inventive group (administration of RAP-E formulation, dose: 25 mg/kg, Q3d*4). 6 week old Balb/c mice (BioLasco, Ilan, Taiwan) were inoculated subcutaneously with $1*10^5$ CT26 cells (murine colorectal carcinoma cell). Following tumor inoculation, measuring the tumor size twice a week, and starting treatment when the tumor grows to 80-100 mm³. FIG. 7A shows the tumor volume on day 0 and day 16 for each group. Mean inhibition rate of 5-FU and RAP-E formulation were 11% and 37%, respectively; Day 16 tumor inhibition rate of 5-FU and RAP-E formulation were 26% and 53%, respectively; and both groups exhibited greater inhibition of tumor volume over the control group. FIG. 7B shows the body weight change of mice in each group, especially significant weight loss in the group of administration of 5-FU. The results reveal that the inventive formulation (RAP-E) can achieve superior efficacy (inhibition of tumor size) to 5-FU but has lower toxicity.

What is claimed is:

1. A liposome comprising a lipid ingredient encapsulating rapamycin or an analog thereof, or a prodrug or salt of rapamycin or its analog,
  wherein: the lipid ingredient is:
    (1) a combination of dipalmitoylphosphatidylcholine (DPPC), 1,2-Didecanoyl-sn-glycero-3-phosphocholine (DDPC), and PEGlated 1,2-Distearoyl-sn-glycero-3-phosphorylethanolamine (DSPE-PEG),
      wherein (a) the DPPC, DDPC, and DSPE-PEG are respectively present in an amount of about 35% (w/w), about 27% (w/w), and about 23% (w/w), based on the dry weight of the total amount of the liposome, or (b) the DPPC, DDPC, and DSPE-PEG are present in a weight ratio of about 2.4:1.9:1.6; or
    (2) a combination of DOPE (dioleoyl phosphatidyl ethanolamine), DDPC, and DSPE-PEG,
      wherein (a) the DOPE, DDPC, and DSPE-PEG are respectively present in an amount of about 35% (w/w), about 27% (w/w), and about 23% (w/w), based on the dry weight of the total amount of the liposome, or (b) the DOPE, DDPC, and DSPE-PEG are present in a weight ratio of about 2.4:1.8:1.6;
  the rapamycin analog is able to inhibit a mammalian target of rapamycin (mTOR); and the amount of rapamycin or an analog thereof, or a prodrug or salt of rapamycin or its analog, based on the dry weight of the total amount of liposome, ranges from about 10% (w/w) to 25% (w/w).

2. The liposome of claim 1, wherein the liposome is a poly(ethylene glycol) (PEG)-modified liposome.

3. The liposome of claim 1, wherein the analog of rapamycin is selected from the group consisting of everolimus, temserolimus, tacrolimus, prerapamycin, zotarolimus, ridaforolimus, 7-epi-rapamycin, 7-thiomethyl-rapamycin, 7-epi-trimethoxyphenyl-rapamycin, 7-epi-thiomethyl-rapamycin, 7-demethoxy-rapamycin, 32-demethoxy-rapamycin, 2-desmethyl-rapamycin, and 42-O-(2-hydroxy)ethyl rapamycin, rapamycin oximes, rapamycin aminoesters, rapamycin dialdehydes, rapamycin 29-enols, O-alkylated rapamycin derivatives, water soluble rapamycin esters, alkylated rapamycin derivatives, rapamycin amidino carbamates, biotin esters of rapamycin, carbamates of rapamycin, rapamycin hydroxyesters, rapamycin 42-sulfonates, 42-(N-carbalkoxy) sulfamates, rapamycin oxepane isomers, imidazolidyl rapamycin derivatives, rapamycin alkoxyesters, rapamycin pyrazoles, acyl derivatives of rapamycin, rapamycin amide esters, rapamycin fluorinated esters, rapamycin acetals, oxorapamycins, and rapamycin silyl ethers.

4. The liposome of claim 1, wherein the average particle size of the liposome ranges from about 100 nm to about 500 nm.

5. A liposome formulation comprising the liposome of claim 1 and a cryoprotectant.

6. The liposome formulation of claim 5, wherein the cryoprotectant is a disaccharide.

7. The liposome formulation of claim 5, wherein the cryoprotectant is sucrose or trehalose.

8. The liposome formulation of claim 5, wherein the cryoprotectant based on the dry weight of the total amount of liposome ranges from about 80% to about 97% (w/w).

9. A method for treating a cancer, diabetes, obesity, neurological disease or genetic disorder and/or preventing an organ transplant rejection, in a subject, comprising administering a therapeutically effective amount of the liposome of claim 1 to the subject.

* * * * *